United States Patent [19]

Lindgren

[11] Patent Number: 5,406,750
[45] Date of Patent: Apr. 18, 1995

[54] CHAIN OPERATOR FOR WINDOWS

[75] Inventor: Claes Lindgren, Farum, Denmark

[73] Assignee: V. Kann Rasmussen Industri A/S, Søborg, Denmark

[21] Appl. No.: 59,669

[22] Filed: May 12, 1993

[51] Int. Cl.⁶ ............................................. E05F 11/00
[52] U.S. Cl. ................................................... 49/325
[58] Field of Search ..................... 49/325, 386, 445

[56] References Cited

U.S. PATENT DOCUMENTS

| | | | |
|---|---|---|---|
| 226,045 | 3/1880 | Dickerson | 49/325 |
| 1,260,550 | 3/1918 | Kopp | 49/325 |
| 1,453,845 | 5/1923 | Kopp | 49/325 |
| 1,563,115 | 11/1925 | Stevens . | |
| 1,808,273 | 6/1931 | Webb et al. | 49/325 |
| 2,086,707 | 7/1937 | Falk | 49/325 |
| 2,698,173 | 12/1954 | Rydell . | |
| 2,832,590 | 4/1958 | Youngberg | 49/325 |
| 3,819,495 | 4/1989 | Hörmann | 49/325 |
| 4,481,735 | 11/1984 | Jentoft et al. | 49/325 |
| 4,521,993 | 6/1985 | Tacheny et al. . | |
| 4,945,678 | 8/1990 | Berner et al. | 49/325 |
| 5,097,629 | 3/1992 | Guhl et al. . | |
| 5,179,803 | 1/1993 | Lense | 49/386 |

Primary Examiner—Michael J. Milano
Attorney, Agent, or Firm—Lane, Aitken & McCann

[57] ABSTRACT

An operator for a window has a chain as an operating member, a sprocket wheel for advancing and retracting the chain, and a counterbalancing spring operatively connected to a shaft of the sprocket wheel.

12 Claims, 6 Drawing Sheets

CHAIN OPERATOR FOR WINDOWS

BACKGROUND OF THE INVENTION

The present invention relates to an operator unit for opening and closing a window and, more particularly, to a window operator employing a chain.

Manually-operated and power-driven operators are known for moving a window between closed and open positions, for example, a window having a stationary main frame mounted in a roof of a house or other building, especially a sloped roof, and a sash hinged to the main frame at the top of the sash for pivoting toward and away from the main frame. Such operators are typically mounted on a bottom member of the main frame and connected to a bottom member of the sash for pushing the sash away from the main frame and drawing the sash into engagement with the main frame. When the window operator is actuated to move the window in an opening direction, it must overcome a component of the weight of the window, especially when the window is mounted in a roof. A chain operator for a window is disclosed in U.S. Pat. No. 4,521,993 issued to Tacheny et al.

SUMMARY OF THE INVENTION

The construction according to the present invention offers the advantage that, in the closed condition of the window, the chain which is the operating member between the sash and the main frame is completely accommodated in the housing. Furthermore, a counterbalancing spring is provided in the housing to counteract the weight component of the window and, thereby, reduce the force which must be applied to the operator, either by hand or by a power unit.

DETAILED DESCRIPTION OF THE PREFERRED EMBODIMENTS

Figure 1:
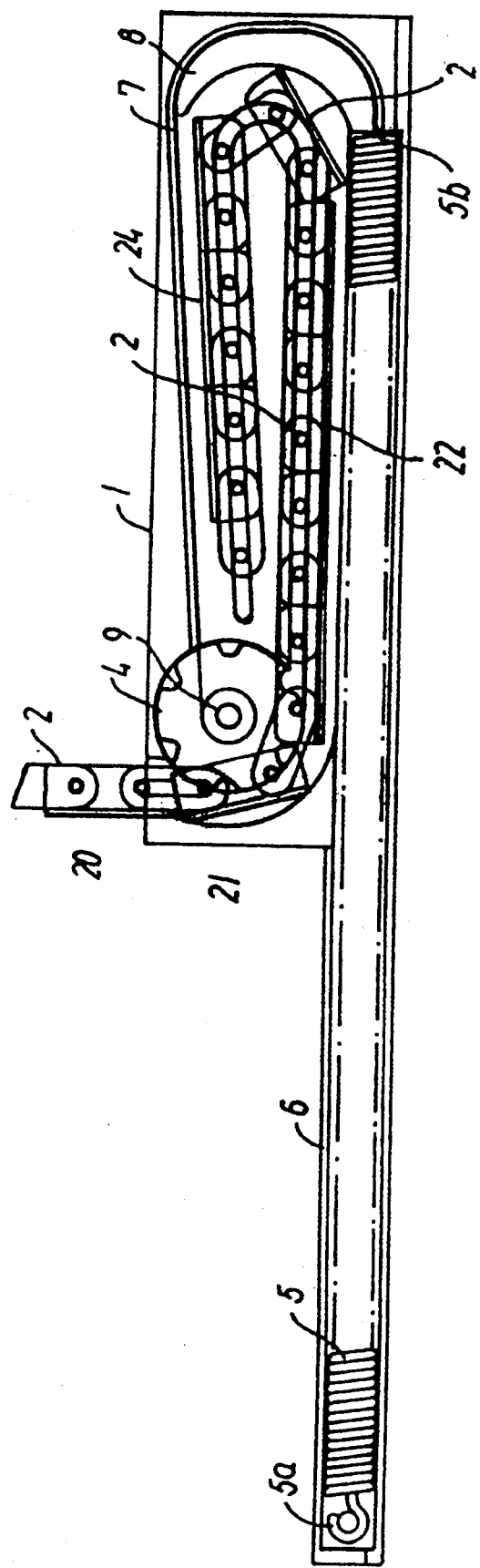
FIG. 1 is a top side view of the operator unit according to the present invention with a cover of the housing removed.

As can best be seen from FIG. 1, an operator housing 1 is designed for mounting on a frame member of the main frame of a pivotally opening window opposite to the pivot axis of the main frame, e.g., at the bottom frame member of a main frame of a top-hinged window, in particular a window designed for installation in an inclined roof surface.

The housing 1 accommodates a flexible operating member designed as a chain 2 or chain-like member guided by guide rails 20 to 24. One end of the chain 2 is designed to extend outside the housing 1 for releasable or permanent coupling to the corresponding member of the sash of the window, e.g., the bottom sash member of the sash of the window.

Inside the housing 1, the chain 2 is in operative connection with a drive wheel forming a sprocket wheel 4 for the chain, the sprocket wheel being rotatably mounted in the housing. As easily appreciated, clockwise rotation of wheel 4 in FIG. 1 will move the chain 2 in the direction of opening the window.

The arrangement is counterbalanced by a tension spring 5, one end 5a of which is secured at the end of an extension 6 of the housing 1, whereas the other end 5b is connected through a flexible member 7 like a wire or cord guided in the housing by a guide member 8 to a connection on a shaft 9 of the wheel 4 in a manner to assist the clockwise rotation of the wheel 4, thereby facilitating the opening movement of the window by compensating for the weight of the window. In order to adapt the counterbalancing spring arrangement to different window sizes and/or roof inclinations, adjusting means for adjusting the tension of spring 5 may be provided at the end 5a of the spring, e.g., in the manner illustrated in FIG. 10 and explained below. The flexible member 7 is connected to and wound around the shaft 9, so that the flexible member winds up on the shaft as the window moves in a closing direction and unwinds as the window moves in an opening direction. The tension spring 5 is entirely within the housing 1 and defines a longitudinal axis which is stationary in all positions of the window.

Figure 5:
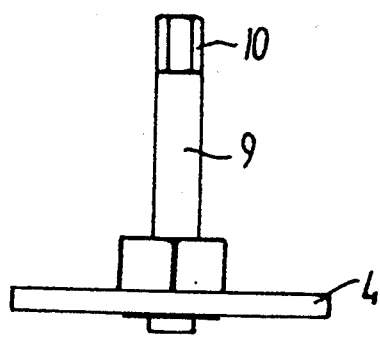
FIG. 5 is an enlarged top view of the sprocket wheel and shaft of FIG. 1.
Figure 7:
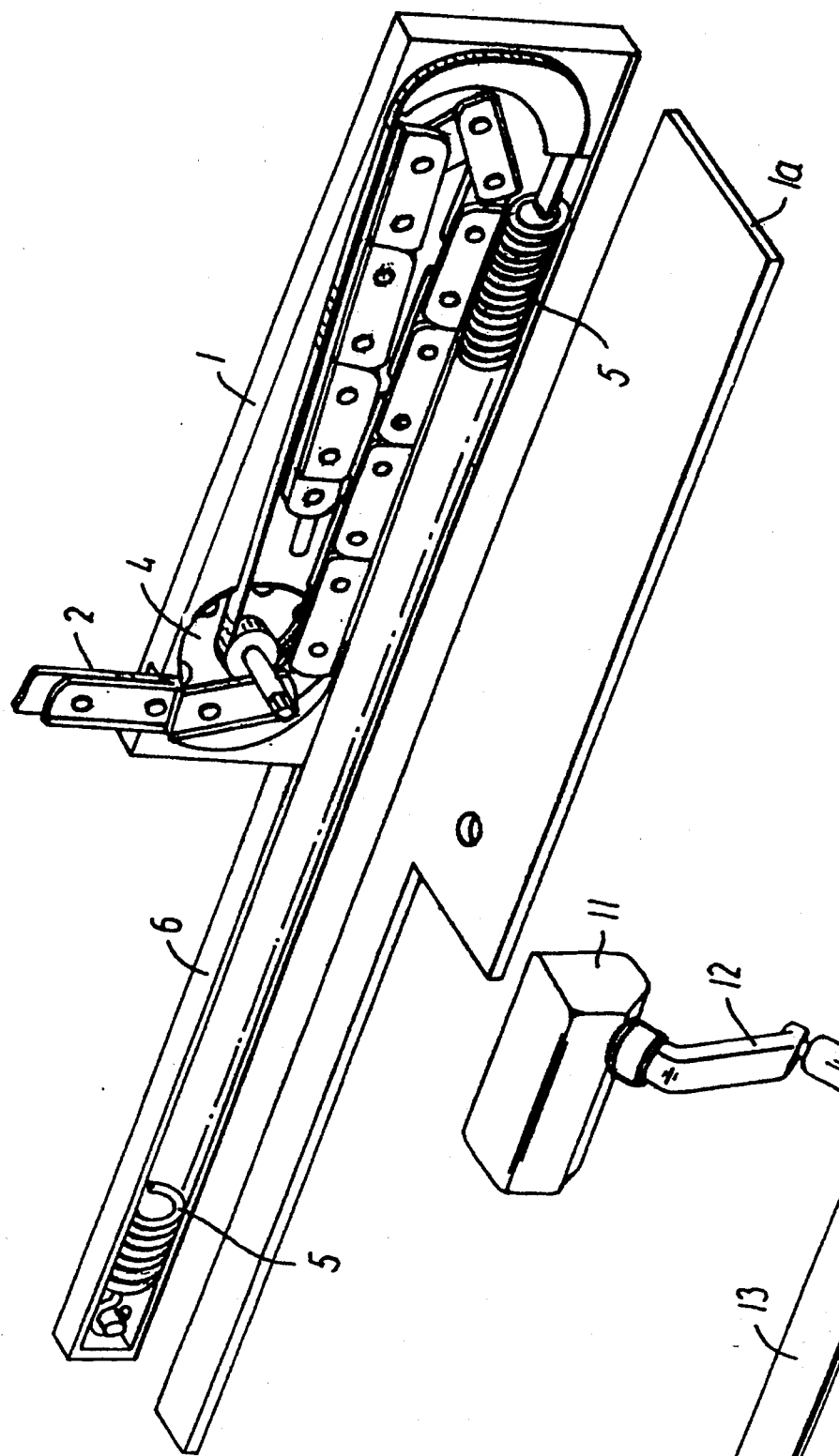
FIG. 7 is a perspective view of the operator according to the present invention and a manual drive unit aligned with the sprocket wheel shaft, showing the cover of the housing removed and lying in a horizontal orientation.
Figure 8:
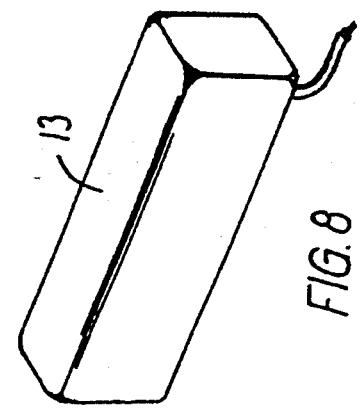
FIG. 8 is a perspective view of an alternate, electric drive unit.

As seen in FIGS. 5, 7 and 8, the shaft 9 of the wheel 4 terminates in a pin 10 of a non-circular, e.g. hexagonal, cross-section, which may cooperate either with a manual drive unit ill operated by a handle 12, e.g. a crank, or with a motor drive unit 13. In FIG. 7, a cover 1a for the housing 1 is shown removed and lying in front of the housing.

Figure 2:
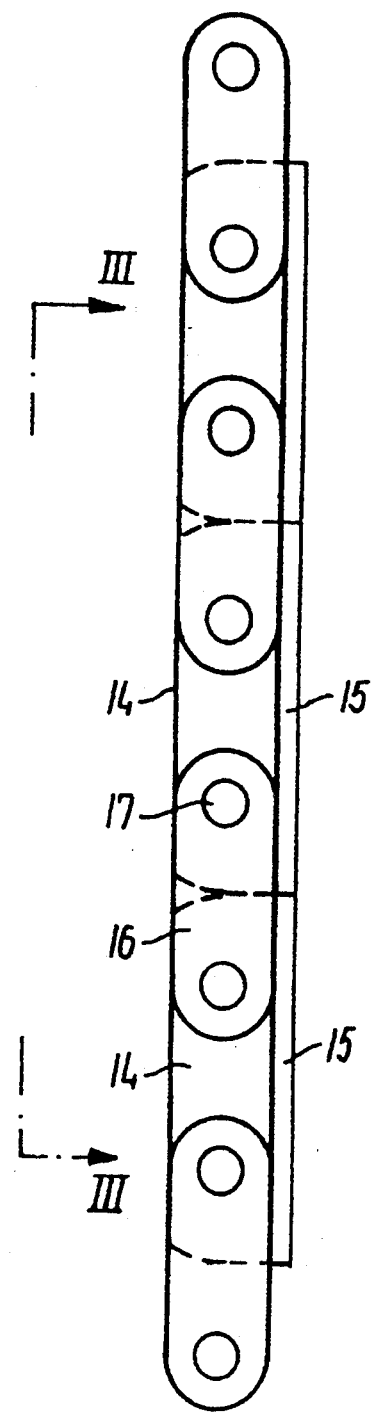
FIG. 2 is an enlarged view of a section of the chain of the operator unit of FIG. 1.
Figure 3:
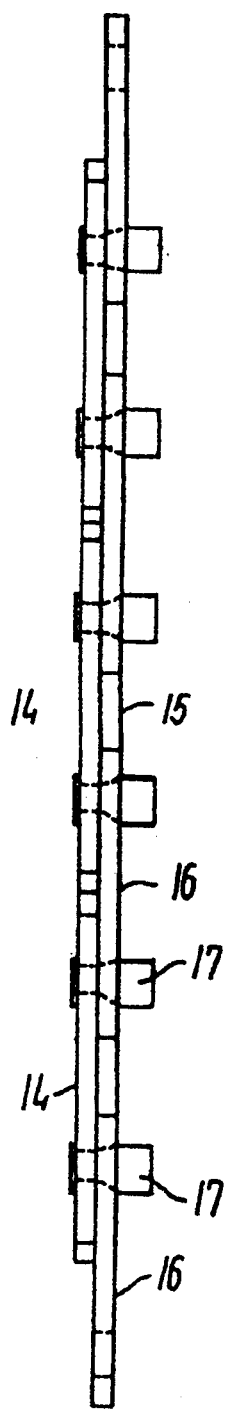
FIG. 3 is a right side view of the section of chain of FIG. 2.
Figure 4:
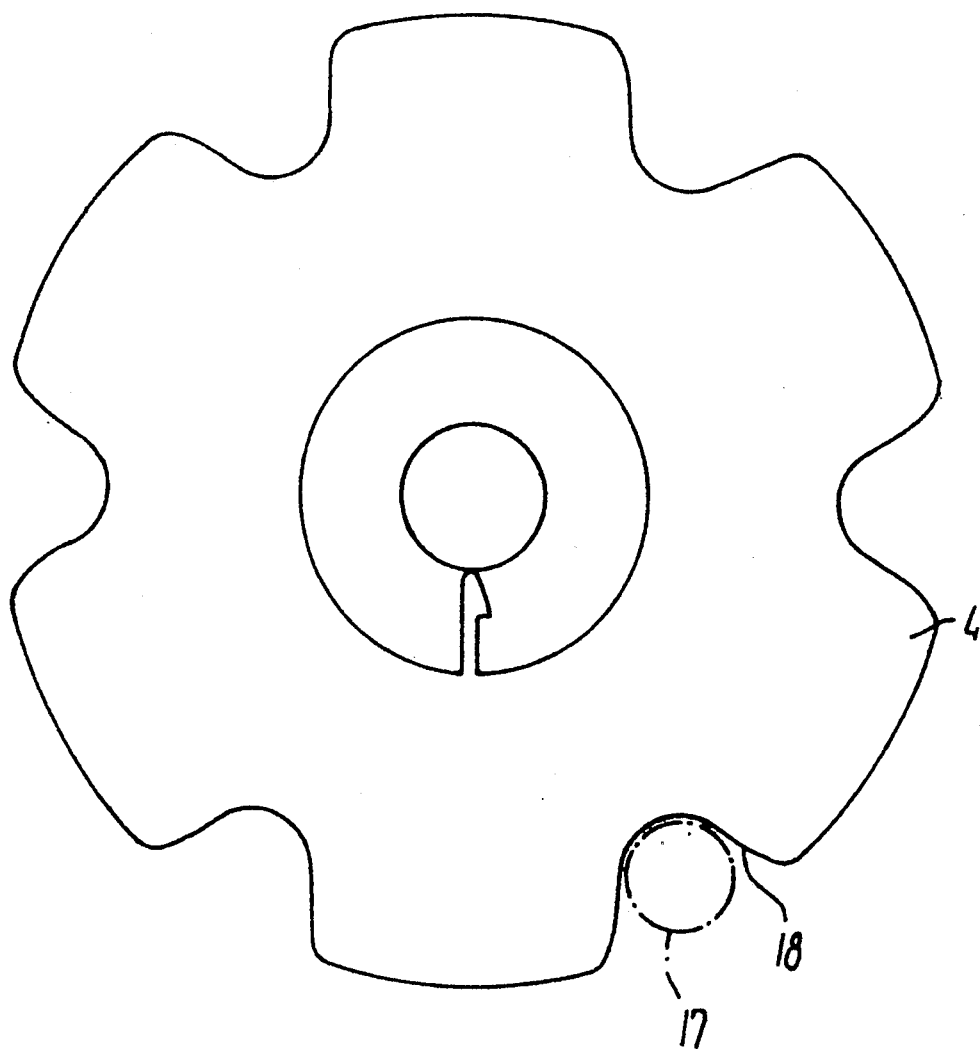
FIG. 4 is an enlarged view of the sprocket wheel of the operator of FIG. 1.

As seen in FIGS. 2–4, the chain 2 is composed of chain members 14 of a substantially L-shaped cross-section providing an edge flange 15. Members 14 are interconnected by chain links 16 by means of rivets 17 or the like forming pivotal joints between members 14 and links 16. This structure provides improved strength and rigidity to chain 2 so that it will only deflect in the direction illustrated in FIGS. 1 and 7. The chain 2 exerts a force on the sash of the window when said chain is under a compressive load applied along the longitudinal axis of the chain.

Figure 6:
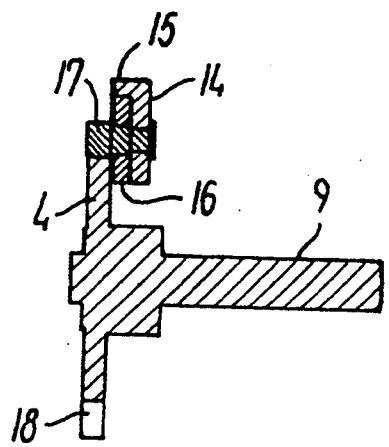
FIG. 6 is a cross-section showing engagement between the sprocket wheel and a rivet of the chain.

Rivets 17 protrude to one side of the chain 2 to engage with curved recesses 18 in the circumference of the sprocket wheel 4, as can be seen from FIGS. 3 and 6.

Since movement of the window sash from the closed position to a sufficiently open position may require displacement of a considerable length of chain 2 out of housing 1 and, thereby, a considerable number of revolutions of sprocket wheel 4 and shaft 9, if the operative diameter of the sprocket wheel 4 is to be kept within acceptable limits with regard to the dimensions of housing 1, the corresponding length of movement of spring end 5b between the tensioned condition and the tension relieved condition may require a substantial length of spring 5 and corresponding dimensions of extension 6 of housing 1.

Figure 9:
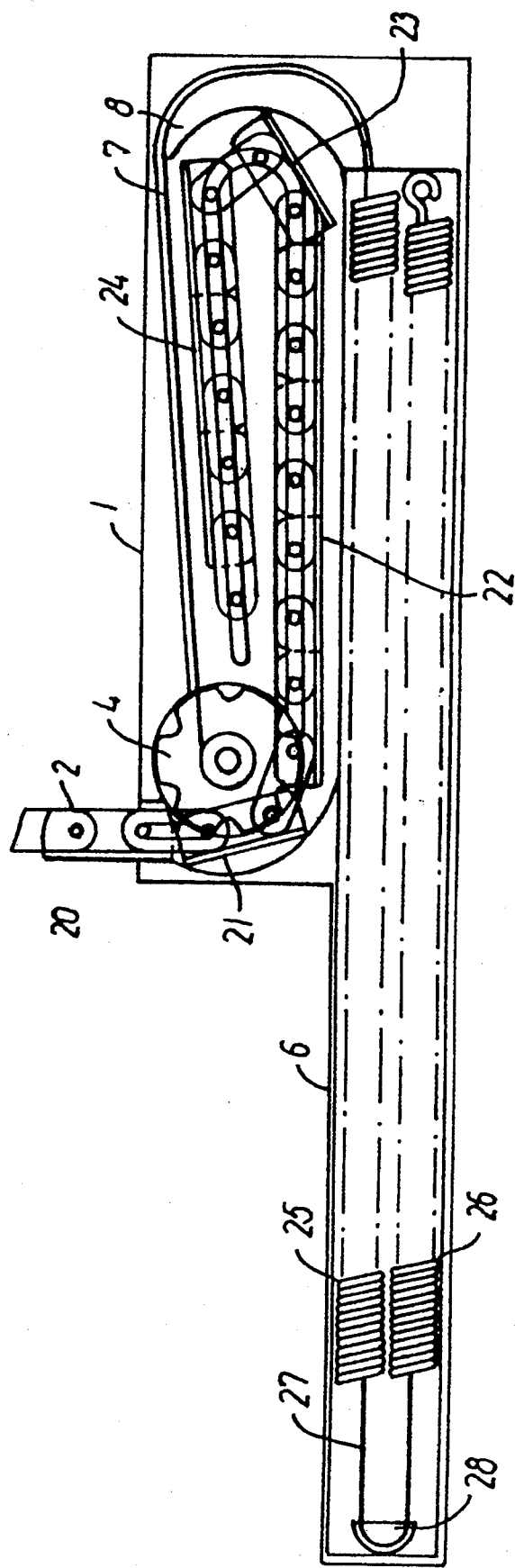
FIGS. 9 and 10 show two alternative embodiments of the operator unit.
Figure 10:
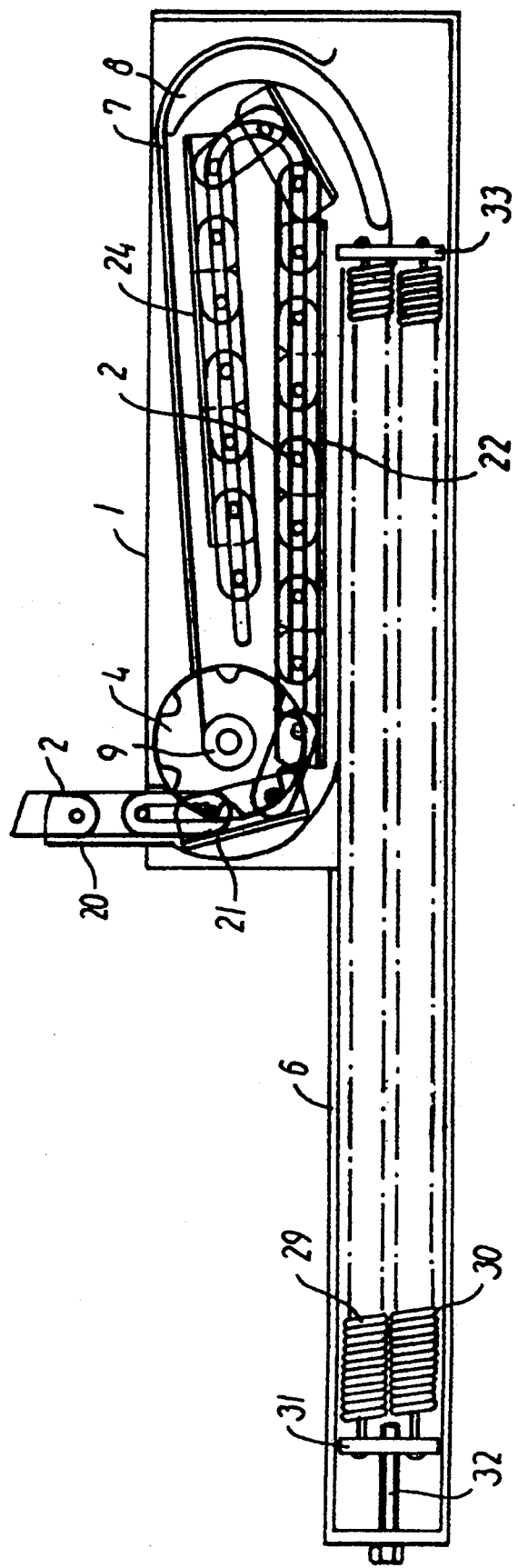

In order to minimize this design restraint, alternative embodiments of the counterbalancing spring arrangement may be provided as illustrated in FIGS. 9 and 10, in which elements corresponding to those of FIG. 1 have been given the same reference numerals.

In FIG. 9, the counterbalancing spring arrangement comprises two separate tension springs 25 and 26 connected in series by means of a flexible member 27 like a wire or a cord which is bent or curved 180 degrees over a guide member 28 so that the separate spring sections 25 and 26 extend in parallel overlying relationship.

Thereby, the length of extension 6 of housing 1 can be significantly reduced compared to what would otherwise be required if a single linear spring were used.

The same result may be achieved by an arrangement as illustrated in FIG. 10, in which two separate springs 29 and 30 are connected in parallel with one end of each spring connected to a common disc or flange member 31 which is displaceable in extension 6 by means of an adjusting screw 32 having a portion projecting out of the extension 6, whereas the other end of each spring is connected with the wire or cord 7 via a common coupling disc or flange 33.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

I claim:

1. An operator for opening and closing a window having a main frame and a sash mounted for movement relative to the main frame, comprising:
    a housing;
    a flexible operating member positioned in said housing and having an end adapted to be connected to the sash;
    means for moving said flexible operating member among positions in which said flexible operating member projects from said housing and a retracted position in which said flexible operating member is entirely accommodated in said housing, the window being closed when said flexible operating member is in said retracted position; and
    counterbalancing spring means positioned entirely within said housing and connected to said moving means, through a flexible member for transmitting a counterbalancing force to said flexible operating member to facilitate movement of the window from said retracted position to an open position.

2. The operator of claim 1, wherein said flexible operating member is a chain and said means for moving said flexible operating member comprises a rotatable sprocket wheel mounted in said housing, said rotatable sprocket wheel engaging said chain.

3. The operator of claim 2, wherein said rotatable sprocket wheel has a shaft, said shaft having means for coupling said shaft to one of a manual drive unit and an electric drive unit.

4. The operator of claim 3, further comprising a manual drive unit.

5. The operator of claim 3, wherein said counterbalancing spring means comprises a tension spring one end of which is connected with a stationary part of said housing, whereas the other end is operatively connected with said sprocket wheel.

6. The operator of claim 5, wherein said one end of the spring is connected with said stationary wall of the housing via adjusting means for adjusting the spring tension.

7. The operator of claim 1, wherein said counterbalancing spring means comprises two separate spring sections connected in parallel.

8. The operator of claim 3 further comprising an electric drive unit.

9. The operator of claim 2, wherein said chain comprises alternating chain members and links, and rivets interconnecting said chain members and said links, said rivets having projecting ends, said rotatable sprocket wheel engaging said projecting ends.

10. The operator of claim 1, wherein said counterbalancing spring means has an axis which is stationary.

11. An operator for opening and closing a window having a main frame and a sash mounted for movement relative to the main frame, comprising:
    a housing;
    a flexible operating member positioned in said housing and having an end adapted to be connected to the sash;
    means for moving said flexible operating member among positions in which said flexible operating member projects from said housing and a retracted position in which said flexible operating member is entirely accommodated in said housing, the window being closed when said flexible operating member is in said retracted position; and
    counterbalancing spring means positioned entirely within said housing and acting on said moving means for transmitting a counterbalancing force to said flexible operating member to facilitate movement of the window from said retracted position to an open position, wherein said flexible operating member is a chain and said means for moving said flexible operating member comprises a rotatable sprocket wheel mounted in said housing, said rotatable sprocket wheel engaging said chain, wherein said rotatable sprocket wheel has a shaft, said shaft having means for coupling said shaft to one of a manual drive unit and an electric drive unit, wherein said counterbalancing spring means comprises a tension spring one end of which is connected with a stationary part of said housing, whereas the other end is operatively connected with said sprocket wheel, and wherein said other end is connected with said sprocket wheel via a flexible member wound around the shaft of said sprocket wheel.

12. An operator for opening and closing a window having a main frame and a sash mounted for movement relative to the main frame, comprising:
    a housing;
    a flexible operating member positioned in said housing and having an end adapted to be connected to the sash;
    means for moving said flexible operating member among positions in which said flexible operating member projects from said housing and a retracted position in which said flexible operating member is entirely accommodated in said housing, the window being closed when said flexible operating member is in said retracted position; and counterbalancing spring means positioned entirely within said housing and connected to said moving means for transmitting a counterbalancing force to said flexible operating member to facilitate movement of the window from said retracted position to an open position, wherein said counterbalancing spring means comprises two separate series connected spring sections extending in overlying parallel relationship.

* * * * *